United States Patent
Choi

(10) Patent No.: US 7,864,741 B2
(45) Date of Patent: Jan. 4, 2011

(54) PROCESSING WIRELESS RESOURCES IN MOBILE AD HOC NETWORK

(75) Inventor: Wook Choi, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 459 days.

(21) Appl. No.: 11/649,159

(22) Filed: Jan. 4, 2007

(65) Prior Publication Data

US 2007/0165587 A1 Jul. 19, 2007

(30) Foreign Application Priority Data

Jan. 17, 2006 (KR) .................. 10-2006-0005117

(51) Int. Cl.
H04W 4/00 (2009.01)
(52) U.S. Cl. ..................... 370/338; 455/62
(58) Field of Classification Search ........... 370/338; 455/62
See application file for complete search history.

(56) References Cited

U.S. PATENT DOCUMENTS

| 5,524,280 | A  | * | 6/1996  | Douthitt et al. ........... 455/62   |
| 6,393,032 | B1 | * | 5/2002  | Ikegami ................... 370/447  |
| 6,668,159 | B1 | * | 12/2003 | Olofsson et al. ......... 455/67.11 |
| 2004/0120292 | A1 | * | 6/2004 | Trainin ................... 370/338  |
| 2005/0185632 | A1 | * | 8/2005 | Draves et al. ............ 370/351  |
| 2005/0190784 | A1 | * | 9/2005 | Stine ..................... 370/445  |
| 2006/0251098 | A1 | * | 11/2006 | Morioka ................. 370/432  |
| 2007/0133556 | A1 | * | 6/2007 | Ding et al. .............. 370/395.4 |
| 2008/0031187 | A1 | * | 2/2008 | Draves et al. ............ 370/328  |
| 2009/0046714 | A1 | * | 2/2009 | Holmer et al. ........... 370/389  |

FOREIGN PATENT DOCUMENTS

| CN | 1474614        | 2/2004  |
| CN | 1666557        | 9/2005  |
| JP | 2003-258860    | 9/2003  |
| JP | 2005-006314    | 1/2005  |
| KR | 10-2005-0035925 | 4/2005  |
| WO | 2004/071021    | 8/2004  |
| WO | 2004/109473    | 12/2004 |

OTHER PUBLICATIONS

Office action from the State Intellectual Property Office of People's Republic of China issued in Applicant's corresponding Chinese Patent Application No. 200610168599.5 dated Oct. 10, 2008.
Office Action from State Intellectual Property Office of People's Republic of China issued in Applicant's corresponding Chinese Patent Application No. 200610168599.5 dated May 8, 2009.
Office Action form Japanese Patent Office issued in Applicant's corresponding Japanese Patent Application No. 2007-000496 dated Jun. 30, 2009 and Request for Entry of the Accompanying Office Action.

* cited by examiner

Primary Examiner—Kent Chang
Assistant Examiner—Ronald Eisner
(74) Attorney, Agent, or Firm—H.C. Park & Associates, PLC

(57) ABSTRACT

A wireless Ad Hoc network including: a first terminal adapted to scan wireless resources in the network, to set quality information of each wireless resource in accordance with a state of each wireless resource, and to transmit a frame transmission request message containing quality identification information of each wireless resource in accordance with the quality information; and a second terminal adapted to select a wireless resource having a highest quality in accordance with the quality identification information of each wireless resource received from the first terminal and the quality information of each scanned wireless resource, and to transmit a frame transmission response message containing information on the selected wireless resource to the first terminal.

20 Claims, 11 Drawing Sheets

FIG. 4

| Channel 1 | quality 1 |
|---|---|
| Channel 2 | quality 2 |
| ⋮ | ⋮ |
| Channel N | quality N |

PROCESSING WIRELESS RESOURCES IN MOBILE AD HOC NETWORK

CLAIM OF PRIORITY

This application makes reference to, incorporates the same herein, and claims all benefits accruing under 35 U.S.C. §119 from an application for APPARATUS AND METHOD FOR PROCESSING WIRELESS RESOURCES IN MOBILE AD HOC NETWORK earlier filed in the Korean Intellectual Property Office on the 17 Jan. 2006 and there duly assigned Serial No. 10-2006-0005117.

BACKGROUND OF THE INVENTION

1. Field of the Invention

The present invention relates to a method and apparatus to process wireless resources in a wireless Ad Hoc network.

2. Description of the Related Art

A wireless Ad Hoc network refers to a kind of network capable of effecting communication, such as data transmission and reception through routing between wireless terminals when an infrastructure does not exist, rather than effecting communication when a network infrastructure, such as a conventional network, has been established. The Ad Hoc network has neither a base station nor a central control system, such as an Access Point (AP), and enables wireless terminals to transmit and receive data therebetween.

Accordingly, the respective wireless terminals participating in the Ad Hoc network must be able to perform operations of a router and a server for themselves, and enable packet transmission and reception without assistance of a base station or an AP. Such an Ad Hoc network is called an Independent Basic Service Set (IBSS). The wireless terminal of the Ad Hoc network directly communicates with other wireless terminals within a communication area.

In general, the Ad Hoc network is constituted of several wireless terminals provided during a specific period for a specific purpose. An example of the Ad Hoc network can be an Ad Hoc network temporarily configured when a meeting is held in a conference room.

However, the wireless Ad Hoc network includes limited wireless resources (e.g. one channel). Hence, the respective terminals transmitting and receiving the data frame in the network require effective usage of the limited wireless resources.

SUMMARY OF THE INVENTION

It is an object of the present invention to provide an apparatus and method of processing wireless resources in a wireless Ad Hoc network, to allow wireless terminals to effectively use wireless resources in the wireless Ad Hoc network.

One aspect of the present invention is to provide a wireless Ad Hoc network including: a first terminal adapted to scan wireless resources in the network, to set quality information of each wireless resource in accordance with a state of each wireless resource, and to transmit a frame transmission request message containing quality identification information of each wireless resource in accordance with the quality information; and a second terminal adapted to select a wireless resource having a highest quality in accordance with the quality identification information of each wireless resource received from the first terminal and the quality information of each scanned wireless resource, and to transmit a frame transmission response message containing information on the selected wireless resource to the first terminal.

Each terminal is preferably adapted to generate the frame transmission request message by sequentially adding the wireless resource identification information in accordance with a priority of the quality information.

The state of each wireless resource preferably includes at least one of a share, an error rate, and an available bandwidth of the wireless resource.

Each terminal is preferably adapted to set high quality information for the wireless resource having no influence on communication of the neighboring terminal of the network, and having a low share, a low error rate, and a high available bandwidth.

The second terminal is preferably adapted to store the quality information, which is contained in the frame transmission request message, of each wireless resource of the first terminal.

The first terminal is preferably adapted to detect a frame transfer rate corresponding to a reception intensity of the received frame transmission response message, and to effect data communication with the second terminal, using the detected frame transfer rate and the highest quality wireless resource information contained in the frame transmission response message.

The second terminal is preferably adapted to detect a frame transfer rate corresponding to a reception intensity of the received frame transmission request message, and to include the detected frame transfer rate in the transmitted frame transmission response message, together with the highest quality wireless resource information.

The frame transfer rate is preferably proportional to the reception intensity.

Each terminal is preferably adapted to transmit the frame transmission request message containing the wireless resource identification information in a Ready-To-Send (RTS) frame. Each terminal is preferably adapted to transmit the frame transmission response message containing the highest quality wireless resource information in a Clear-To-Send (CTS) frame.

Another aspect of the present invention is to provide a terminal in a wireless Ad Hoc network, the terminal including: a table manager adapted to scan wireless resources in the network, to set quality information of each wireless resource in accordance with states of the wireless resources, and to manage the set quality information in a table; a controller adapted to transmit a frame transmission request message, containing identification information of each wireless resource in accordance with the quality information, to other terminals on the Ad Hoc network, using the table; and a transfer rate detector adapted to detect a frame transfer rate corresponding to a reception intensity upon a frame transmission response message corresponding to the frame transmission request message being received from the other terminals of the network.

The state of each wireless resource preferably includes at least one of a share, an error rate, and an available bandwidth of the wireless resource.

Still another aspect of the present invention is to provide a terminal in a wireless Ad Hoc network, the terminal including: a table manager adapted to scan wireless resources in the network, to set quality information of each wireless resource in accordance with a share of each wireless resource, and to manage the set quality information in a table; a transfer rate detector adapted to detect a frame transfer rate corresponding to a reception intensity of a frame transmission request message received from other terminals of the network; and a controller adapted to compare the quality identification information of each wireless resource with the quality information of each wireless resource of the table manager, to select a wireless resource having a highest quality, and to transmit a frame transmission response message containing information on the detected frame transfer rate and information on the selected wireless resource to the other terminals upon the frame transmission request message containing quality identification information of each wireless resource being received from other terminals of the network.

Yet another aspect of the present invention is to provide a wireless Ad Hoc network including: a first terminal adapted to scan wireless resources in the network, to set quality information of each wireless resource in accordance with a share of each wireless resource, and to transmit a frame containing quality identification information of each wireless resource in accordance with the quality information; and a second terminal adapted to select wireless resource having a highest quality in accordance with the quality identification information of each wireless resource received from the first terminal and the quality information of each wireless resource, to generate a frame containing information on the selected wireless resource, and to transmit the generated frame to the first terminal.

The first terminal is preferably adapted to detect a frame transfer rate corresponding to a reception intensity of the received frame, and to effect data communication with the second terminal using the detected frame transfer rate and the highest quality wireless resource information.

The second terminal is preferably adapted to detect a frame transfer rate corresponding to a reception intensity of the received frame, and to add the detected frame transfer rate, together with the highest quality wireless resource information to the transmitted frame.

A further aspect of the present invention is to provide a method of processing wireless resources in a wireless Ad Hoc network, the method including: first and second terminals scanning wireless resources in the network, and setting quality information of each wireless resource in accordance with states of the wireless resources; the first terminal generating a frame transmission request message containing quality identification information of each wireless resource in accordance with the quality information, and transmitting the generated frame transmission request message to the second terminal; the second terminal storing the wireless resource quality identification information received from the first terminal, and selecting wireless resource having a highest quality in accordance with the received wireless resource quality identification information and the set quality information of each wireless resource; and the second terminal transmitting a frame transmission response message containing information on the selected wireless resource to the first terminal.

The state of each wireless resource preferably includes at least one of a share, an error rate, and an available bandwidth of the wireless resource.

The first terminal setting the quality information of each wireless resource preferably includes either generating a frame to be transmitted or scanning the wireless resources in accordance with a preset period, and setting the quality information of each wireless resource.

The second terminal setting the quality information of each wireless resource preferably includes either receiving the frame transmission request message or scanning the wireless resources in accordance with a preset period, and setting the quality information of each wireless resource.

Each terminal setting the quality information of each wireless resource preferably includes overhearing communication between neighboring terminals in the network, detecting wireless resources used by the neighboring terminals, and setting the quality information of each detected wireless resource.

The method preferably further includes the first terminal detecting a frame transfer rate corresponding to a reception intensity of the received frame transmission response message, and effecting data communication with the second terminal using the detected frame transfer rate and the highest quality wireless resource information contained in the frame transmission response message.

The frame transfer rate is preferably proportional to the reception intensity.

The method preferably further includes: the second terminal detecting a frame transfer rate corresponding to a reception intensity of the received frame transmission request message, and adding the detected frame transfer rate to the transmitted frame transmission response message; and the first terminal transmitting and receiving a data frame using the frame transfer rate and the highest quality wireless resource information contained in the received frame transmission response message.

Still a further aspect of the present invention is to provide a method of processing wireless resources in a wireless Ad Hoc network, the method including: scanning wireless resources in the network, and setting quality information of each wireless resource in accordance with states of the wireless resources; and generating a frame transmission request message containing identification information of each wireless resource in accordance with the quality information, and transmitting the generated frame transmission request message to other terminals of the network.

The method preferably further includes detecting a frame transfer rate in accordance with a reception intensity of the message upon receiving the frame transmission response message corresponding to the transmitted frame transmission request message.

Yet a further aspect of the present invention is to provide a method of processing wireless resources in a wireless Ad Hoc network, the method including: scanning wireless resources in the network, and setting quality information of each wireless resource in accordance with a share of each wireless resource; receiving a frame transmission request message containing quality identification information of each wireless resource from other terminals of the network, and storing the received frame transmission request message; comparing the received quality identification information of each wireless resource with the set quality information of each wireless resource, and selecting a wireless resource having a highest quality; and transmitting a frame transmission response message containing information on the selected wireless resource having the highest quality to the other terminals.

The method preferably further includes detecting a frame transfer rate corresponding to a reception intensity of the received message and including the detected frame transfer rate in the transmitted frame transmission response message upon receiving the frame transmission request message from the other terminals.

A last aspect of the present invention is to provide a method of processing wireless resources in a wireless Ad Hoc network, the method including: first and second terminals scanning wireless resources in the network and setting quality information of each wireless resource in accordance with states of the wireless resources; the first terminal generating an frame containing quality identification information of each wireless resource in accordance with the quality information and transmitting the generated frame to the second terminal; the second terminal selecting a wireless resource having a highest quality in accordance with the quality identification information of the received respective wireless resources and the setting quality information of each wireless resource; and the second terminal transmitting a frame containing information on the selected wireless resource to the first terminal.

The method preferably further includes the first terminal detecting a frame transfer rate corresponding to a reception intensity of the received frame and effecting data communication with the second terminal using the detected frame transfer rate and information of the highest quality wireless resource contained in the message.

The method preferably further includes: the second terminal detecting a frame transfer rate corresponding to a reception intensity of the received frame and adding the detected frame transfer rate to a transmitted frame transmission response message; and the first terminal transmitting and receiving a data frame using the frame transfer rate contained in the received frame and information of the highest quality wireless resource.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein:

FIG. 4 is a view of a wireless resource quality information table according to an exemplary embodiment of the present invention;

DETAILED DESCRIPTION OF THE INVENTION

Hereinafter, exemplary embodiments of the present invention are described in detail with reference to the accompanying drawings. In the following description, a detailed description of known functions and configurations incorporated herein has been omitted for conciseness.

Figure 1:
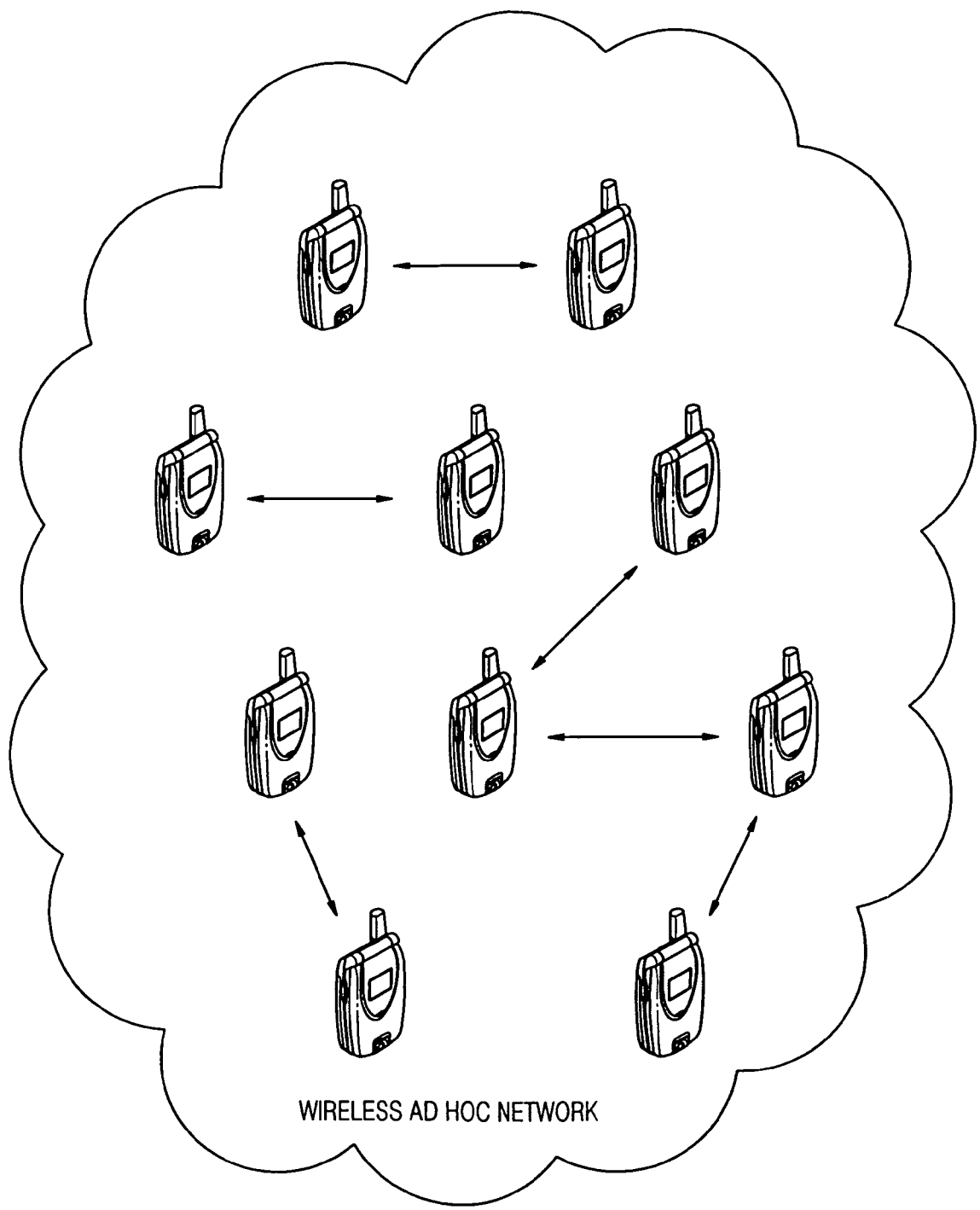
FIG. 1 is a view of an Ad Hoc network according to an exemplary embodiment of the present invention.

FIG. 1 is a view of an Ad Hoc network according to an exemplary embodiment of the present invention.

As illustrated in FIG. 1, the wireless Ad Hoc network can be configured to include at least one wireless terminal (hereinafter, referred to as a terminal). The wireless Ad Hoc network has neither a base station nor a central control system, such as an AP, and enables the respective terminals to transmit and receive data therebetween. Accordingly, the respective terminals participating in the network can perform operations of a router and a server for themselves so as to transmit and receive a data frame without assistance of a base station or an AP.

The respective terminals can scan wireless resources used by neighboring terminals in the Ad Hoc network, and set information on the quality of each wireless resource in accordance with states of the scanned wireless resources. The "state of each wireless resource" can include a wireless resource share, an error rate, and a maximum available bandwidth. The "wireless resource share" is a frequency of transmission and reception of a frame transmitted and received between the wireless terminals through the scanned wireless resources respectively occupied by the wireless terminals.

As to the quality of each wireless resource, a high quality can be given in sequence of the lowest share and error ratio and the highest maximum available bandwidth.

Such a terminal can detect an optimal wireless resource and a frame transfer rate that can be used to transmit and receive a data frame to and from any other terminal in the Ad Hoc network, using the quality information of the wireless resources.

The wireless resources are designated as a generic concept of a channel and a multi-radio. As an example of the wireless resources, the channel will be described below.

Figure 2:
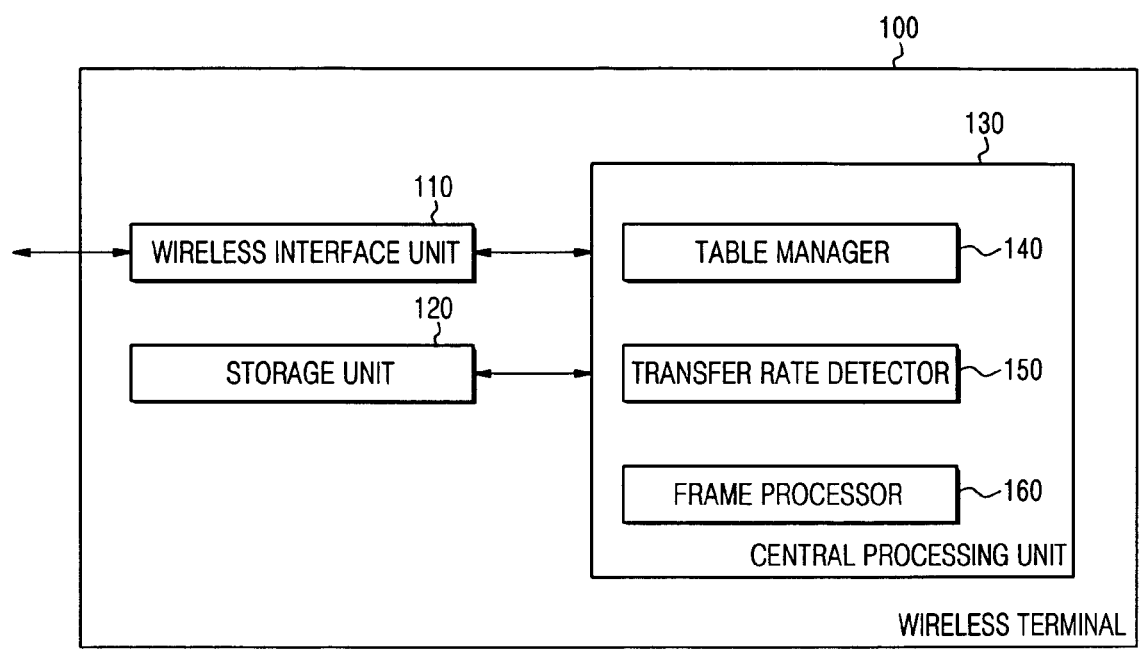
FIG. 2 is a view of a wireless terminal according to an exemplary embodiment of the present invention.

FIG. 2 is a view of a wireless terminal according to an exemplary embodiment of the present invention.

As illustrated in FIG. 2, the terminal 100 includes a wireless interface unit 110, a storage unit 120, and a central processing unit 130. The central processing unit 130 can include a table manager 140, a transfer rate detector 150, and a frame processor 160.

The wireless interface unit 110 can transmit a frame to other terminals in the Ad Hoc network through a wireless medium, or can receive a frame from the other terminals through the wireless medium.

The storage unit 120 can store operational program information, an available channel, and a frame transfer rate of the terminal 100.

The central processing unit 130 can analyze channels used by the neighboring terminals, manage the analyzed channels in a table form, and manage the transmitted and received frames. The central processing unit 130 can detect the frame transfer rate corresponding to a reception intensity of the frames received from the other terminals.

In other words, the table manager 140 of the central processing unit 130 can conform to a set period or scan the channels used by the neighboring terminals in the Ad Hoc network through the wireless interface unit 110 before transmission and reception of the data frames, and analyze states of the scanned channels. The table manager 140 can overhear communication effected between the neighboring terminals, and detect the channels used by the neighboring terminals. The "channel state" can include a channel share, an error rate, and a maximum available bandwidth.

The table manager 140 sets the quality information of each channel in accordance with the analyzed channel state, and generates a channel quality information table.

FIG. 4 is a view of a channel quality information table according to an exemplary embodiment of the present invention.

As illustrated in FIG. 4, in the channel quality information table, a high quality can be given in sequence of an optimal channel available in the terminal 100. The available optimal channel can be a channel, which has a lowest channel share and a lowest error rate, and provides a highest available bandwidth without affecting communication of the neighboring terminals.

In the transfer rate detector 150 of the terminal that generates the channel quality information table of FIG. 4, the reception intensity can be measured through the frames received from the other terminals, and the frame transfer rate corresponding thereto can be detected.

In other words, the transfer rate detector 150 of the receiving terminal can measure the reception intensity through a Ready-To-Send (RTS) frame received from the transmitting terminal, and detect the frame transfer rate. The transfer rate detector 150 of the transmitting terminal can measure the reception intensity through a Clear-To-Send (CTS) frame received from the receiving terminal, and detect the frame transfer rate.

The frame processor 160 generates a frame transmission request message including channel quality identification information, that is, the typical RTS frame, using the channel quality information table of the table manager 140. The "channel quality identification information" is information for sequentially identifying each channel according to priority of the quality information.

The frame processor 160 compares the channel identification information of the RTS frame received from the other terminals with the channel quality information table managed by the table manager 140, and selects the highest quality channel, that is, the available optimal channel. The frame processor 160 generates a frame transmission response message including the selected available optimal channel, that is, the CTS frame.

In detecting the frame transfer rate, upon receipt of the CTS frame corresponding to the RTS frame generated and transmitted by the frame processor 160 from the receiving terminal, the transfer rate detector 150 measures the reception intensity of the CTS frame and detects the frame transfer rate. The frame transfer rate, a transfer rate used for transmission of the data frame between the transmitting and receiving terminals, is proportional to the reception intensity of the CTS frame.

In detecting the frame transfer rate according to another exemplary embodiment, when receiving the RTS frame from the transmitting terminal, the transfer rate detector 150 can also measure the reception intensity of the RTS frame and detect the frame transfer rate.

A method of processing wireless resources between the wireless terminals having the above construction is described in detail below.

Figure 3:
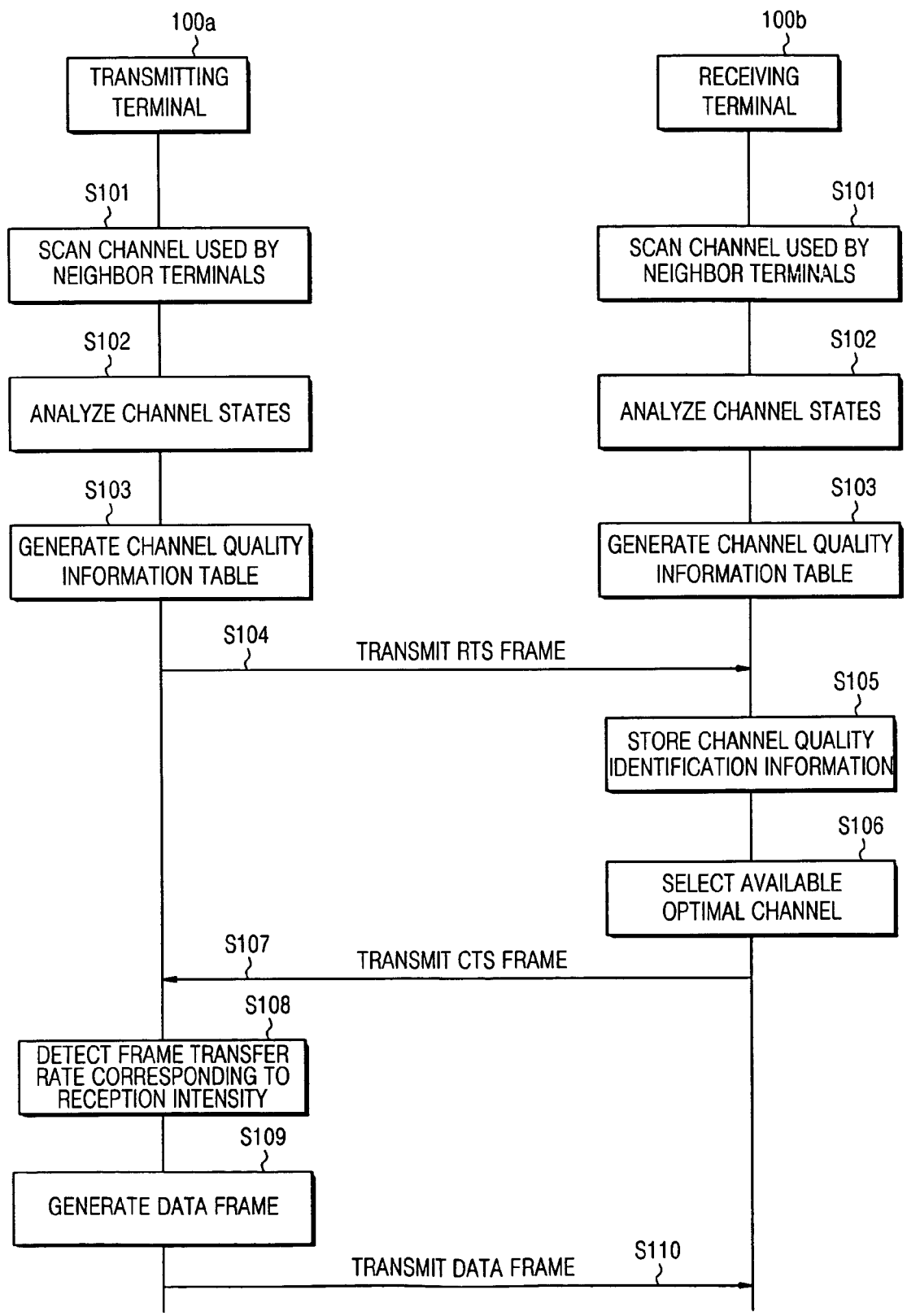
FIG. 3 is a view of a method of processing wireless resources between transmitting and receiving terminals in a wireless Ad Hoc network according to an exemplary embodiment of the present invention.

FIG. 3 is a view of a method of processing wireless resources between a transmitting terminal and a receiving terminal in a wireless Ad Hoc network, according to an exemplary embodiment of the present invention.

As illustrated in FIG. 3, in the wireless Ad Hoc network, the transmitting and receiving terminals 100a and 100b can first scan the channels used by the neighboring terminals in the Ad Hoc network on the basis of the set period (Step 101), and analyze the states of the scanned channels (Step 102). The transmitting and receiving terminals 100a and 100b can also analyze the states of overheard channels together with the scanned channels.

The transmitting and receiving terminals 100a and 100b generate the channel quality information table in which the quality information of each channel is set in accordance with the states of the analyzed channels (Step 103).

When the transmitting terminal 100a generating the channel quality information table transmits the RTS frame to the receiving terminal 100b to which it is intended to transmit the data frame in the Ad Hoc network, it can transmit the RTS frame including the channel quality identification information in which the channel is sequentially identified according to the priority of the quality information using the generated quality table (Step 104).

When receiving the RTS frame from the transmitting terminal 100a, the receiving terminal 100b detects and stores the channel quality identification information included in the received RTS frame (Step 105). The receiving terminal 100b compares the stored channel quality identification information with that of the channel quality information table which the receiving terminal 100b has generated and stored, and selects the available optimal channel (Step 106). The optimal channel can be a channel having the highest available bandwidth, and having the lowest channel share and error rate without affecting the communication of the neighboring terminals on the Ad Hoc network.

The receiving terminal 100b generates the CTS frame including the selected available optimal channel, and transmits it to the transmitting terminal 100a (Step 107).

When receiving the CTS frame from the transmitting terminal 100a, the transmitting terminal 100a can measure the reception intensity of the CTS frame, and detect the frame transfer rate corresponding thereto (Step 108). The frame transfer rate, a transfer rate used for transmitting the data frame between the transmitting and receiving terminals 100a and 100b, can be proportional to the reception intensity.

After detecting the optimal channel included in the received CTS frame, the transmitting terminal 100a can generate the data frame to be transmitted to the receiving terminal 100b (Step 109), and transmit the generated data frame to the receiving terminal 100b using the detected channel and frame transfer rate (Step 110).

On one hand, without scanning the channel according to the set period to generate the quality table, the transmitting and receiving terminals 100a and 100b can scan the channels and generate the quality table only when it is necessary to transmit the RTS frame or when the CTS frame has been received according to another exemplary embodiment. This method has an advantage of minimizing operations of the transmitting and receiving terminals 100a and 100b.

On the other hand, a method in which the transmitting and receiving terminals 100a and 100b scan the channels according to the set period and generate the quality table has an advantage of reducing communication time.

As described above, the transmitting and receiving terminals in the wireless Ad Hoc network set the quality information of each wireless resource depending on the states of the network wireless resources, select the wireless resource having the highest quality using the frame transmission request and response message, and transmit and receive the data frames, thereby effectively utilizing the wireless resources in the Ad Hoc network.

Furthermore, the transmitting terminal in the wireless Ad Hoc network detects the frame transfer rate in accordance with the frame transmission response message received correspondingly to the frame transmission request message transmitted to the receiving terminal, and effects the data frame communication with the receiving terminal using the detected frame transfer rate, thereby transmitting and receiving the data frame to and from the receiving terminal at a highest transfer rate.

Besides the method in which the transmitting terminal 100a detects the frame transfer rate via the received frame transmission response message, that is, via the CTS frame of FIG. 3, in a wireless Ad Hoc network according to another exemplary embodiment, a receiving terminal 100b can also detect a frame transfer rate via a frame transmission request message received from a transmitting terminal 100a, that is, via an RTS frame. When the receiving terminal 100b detects the frame transfer rate via the RTS frame as described above, the receiving terminal 100b can include the detected frame transfer rate in the CTS frame together with the optimal channel.

Besides the transmitting and receiving terminals, other terminals of the wireless Ad Hoc network can obtain the channel quality identification information and the frame transfer rate included in the RTS frame and the CTS frame exchanged between the transmitting and receiving terminals via overhearing.

Figure 5:
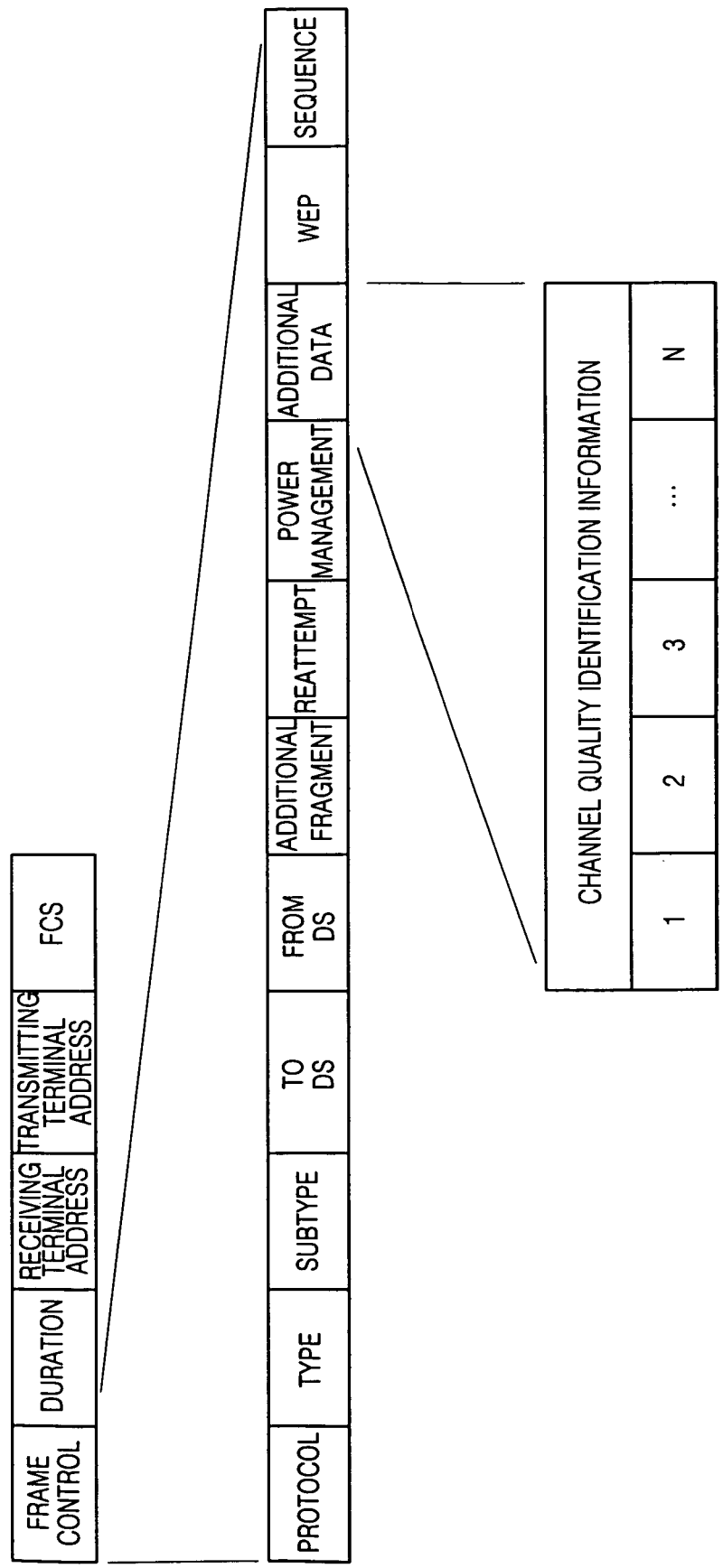
FIG. 5 is a view of an RTS frame according to an exemplary embodiment of the present invention.

FIG. 5 is a view of an RTS frame according to an exemplary embodiment of the present invention.

As illustrated in FIG. 5, the RTS frame has Subtype of a Frame Control field in which information on the RTS frame is set, and the channel quality identification information can be included in additional data.

Furthermore, the RTS frame has a Duration field, which can include a time enough to receive the CTS frame including the optimal channel from the receiving terminal.

Figure 6:
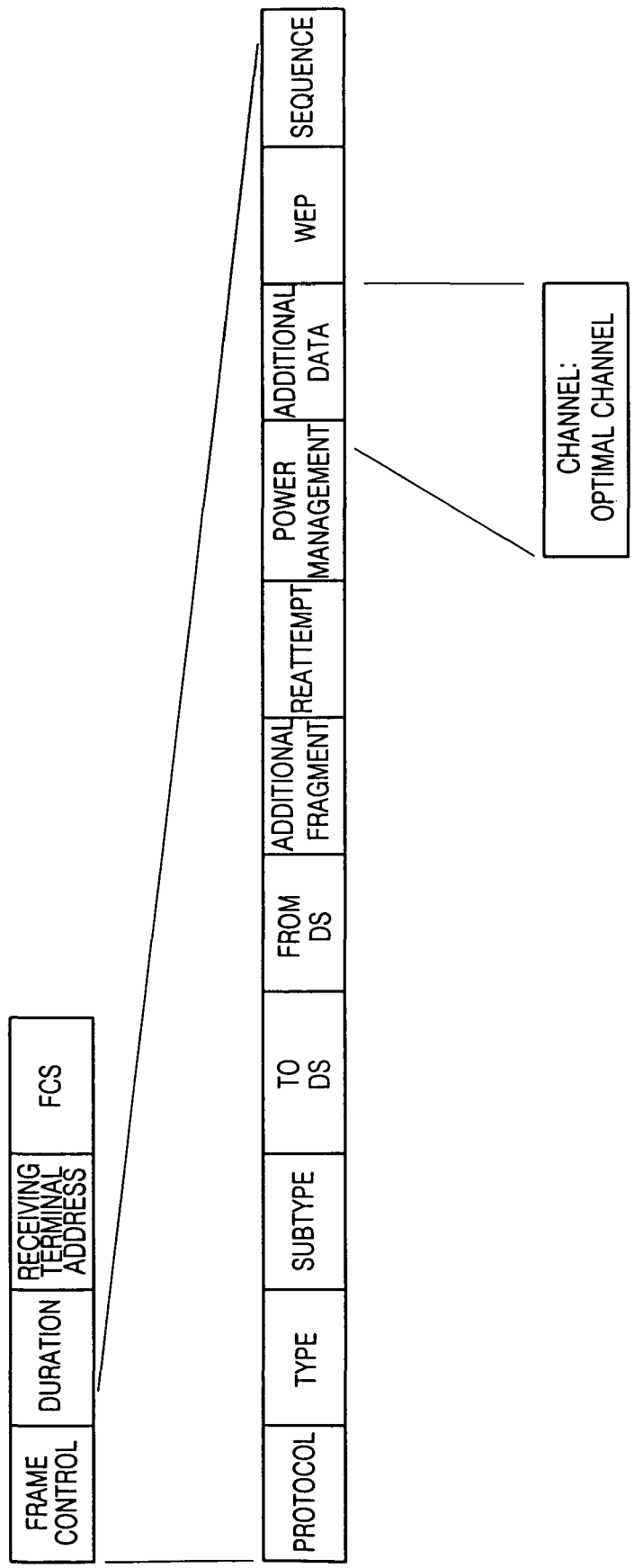
FIG. 6 is a view of a CTS frame according to an exemplary embodiment of the present invention.

FIG. 6 is a view of a CTS frame according to an exemplary embodiment of the present invention.

As illustrated in FIG. 6, the CTS frame has Subtype of a Frame Control field in which information on the CTS frame is set, and the available optimal channel can be included in additional data.

Furthermore, the CTS frame has a Duration field, which can include a use time of the detected channel for data communication with the transmitting terminal.

When the receiving terminal detects the frame transfer rate via the RTS frame, the CTS frame can include the detected frame transfer rate together with the optimal channel in another exemplary embodiment.

Figure 7:
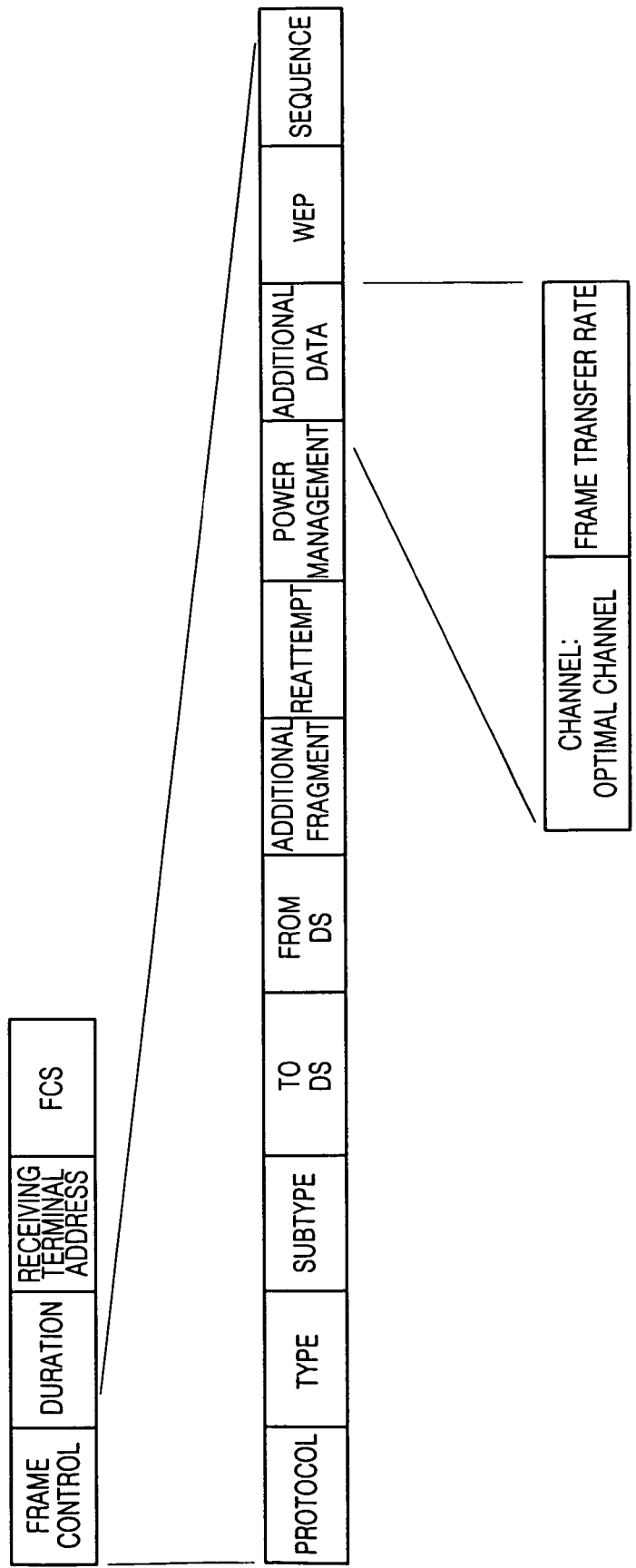
FIG. 7 is a view of a CTS frame according to another exemplary embodiment of the present invention.

FIG. 7 is a view of a CTS frame according to another exemplary embodiment of the present invention.

A method of processing wireless resources in the transmitting or receiving terminal is described in detail as follows.

Figure 8:
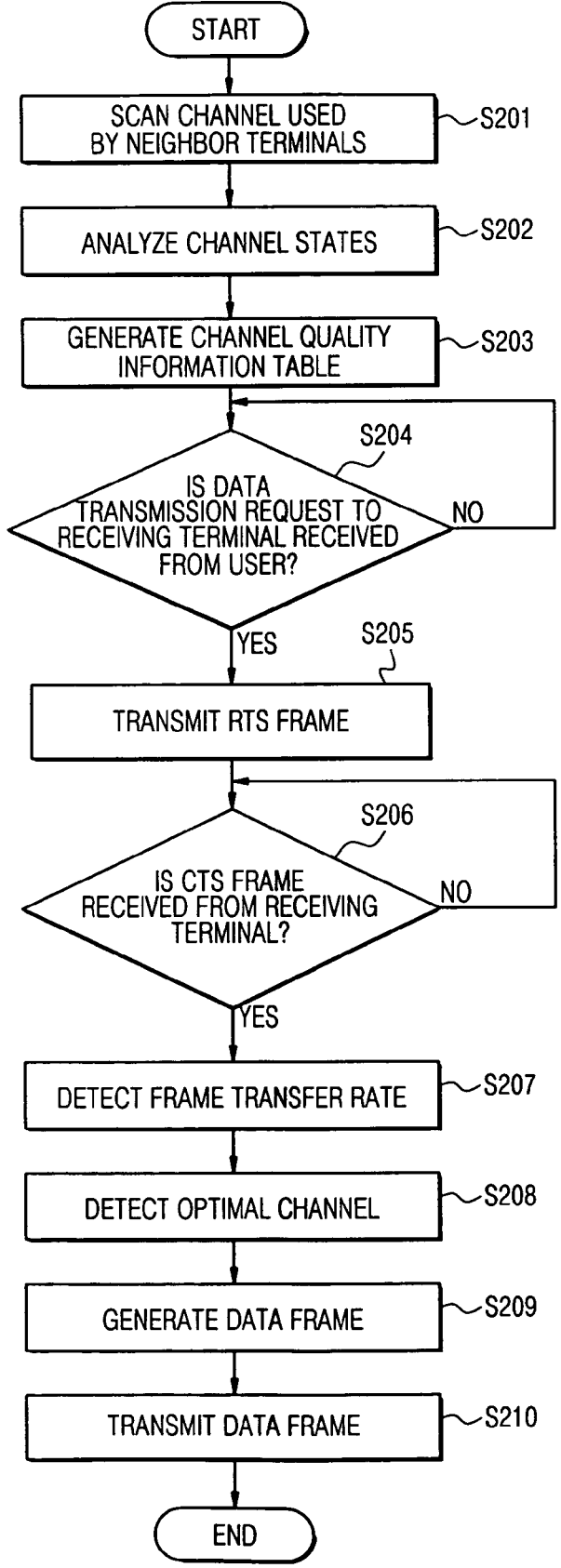
FIG. 8 is a flowchart of a method of processing wireless resources in a transmitting terminal, according to an exemplary embodiment of the present invention.

FIG. 8 is a flowchart of a method of processing wireless resources in a transmitting terminal according to an exemplary embodiment of the present invention.

As illustrated in FIG. 8, the transmitting terminal scans the channels used by the neighboring terminals in the Ad Hoc network according to the set period (Step 201).

The transmitting terminal analyzes states of the scanned channels (Step 202), and generates a channel quality information table in which quality information of each channel is set depending on each channel state (Step 203). The transmitting terminal can also analyze states of the channels overheard from the neighboring terminals and generate the channel quality information table depending on each channel state.

The transmitting terminal determines whether or not a data transmission request to an arbitrary terminal, i.e. a receiving terminal, on the Ad Hoc network is received from a user (Step 204).

Upon receipt of the data transmission request from the user, the transmitting terminal generates the RTS frame including the channel quality identification information using the generated channel quality information table, and transmits the generated RTS frame to the receiving terminal (Step 205).

After transmitting the RTS frame, the transmitting terminal determines whether or not the CTS frame has been received from the receiving terminal (Step 206).

Upon receipt of the CTS frame from the receiving terminal, the transmitting terminal measures the reception intensity of the CTS frame, and detects the frame transfer rate corresponding to the reception intensity (Step 207).

The transmitting terminal detects the available optimal channel included in the received CTS frame (Step 208).

The transmitting terminal generates the data frame for transmission of data received from the user (Step 209), and transmits the generated data frame to the receiving terminal using the detected channel and frame transfer rate (Step 210).

Figure 9:
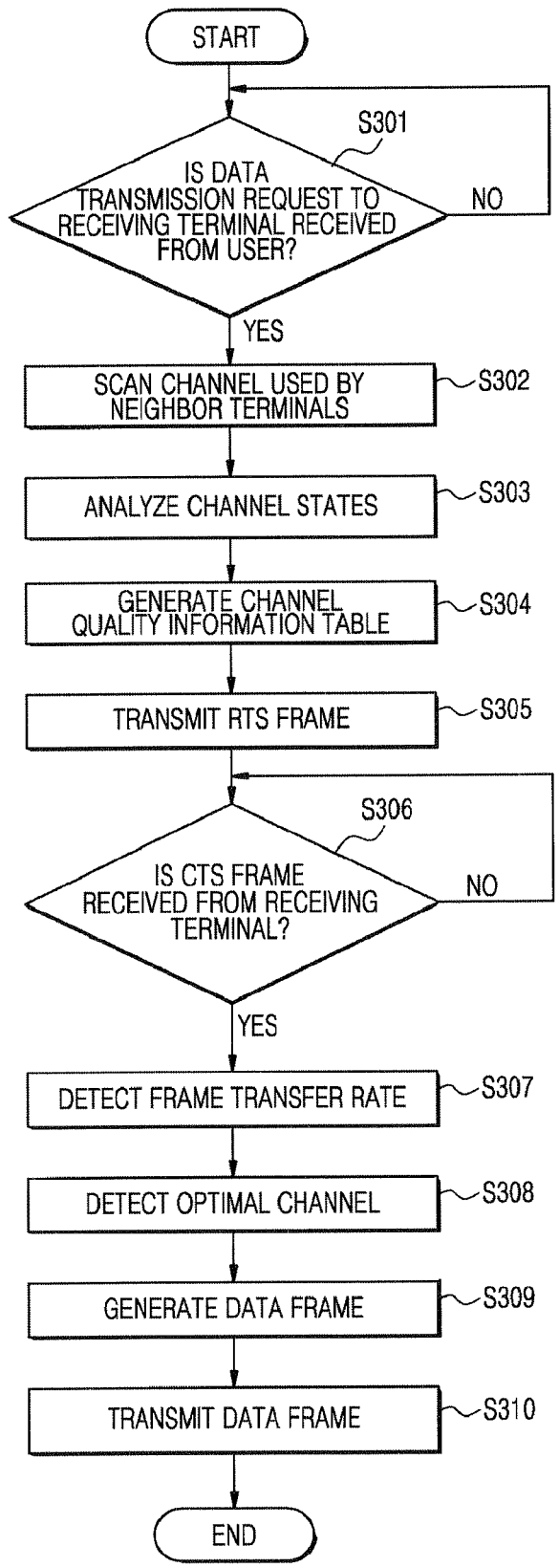
FIG. 9 is a flowchart of a method of processing wireless resources in a transmitting terminal, according to another exemplary embodiment of the present invention.

FIG. 9 is a flowchart of a method of processing wireless resources in a transmitting terminal, according to another exemplary embodiment of the present invention.

As illustrated in FIG. 9, the transmitting terminal determines whether or not a data transmission request to an arbitrary terminal, a receiving terminal, on an Ad Hoc network has been received from a user (Step 301).

When receiving the data transmission request from the user, the transmitting terminal scans channels used by neighboring terminals on the Ad Hoc network (Step 302).

The transmitting terminal analyzes states of the scanned channels (Step 303), and generates channel quality information table in which quality information of each channel is set depending on each channel state (Step 304). The transmitting terminal can also analyze states of the channels overheard from the neighboring terminals and generate the channel quality information table depending on each channel state.

The transmitting terminal generates an RTS frame including the channel quality identification information using the generated channel quality information table, and transmits the generated RTS frame to the receiving terminal (Step 305).

After transmitting of the RTS frame, the transmitting terminal determines whether or not the CTS frame has been received from the receiving terminal (Step 306).

Upon receipt of the CTS frame from the receiving terminal, the transmitting terminal measures a reception intensity of the CTS frame, and detects a frame transfer rate corresponding to the reception intensity (Step 307).

The transmitting terminal detects an available optimal channel share included in the received CTS frame (Step 308).

The transmitting terminal generates the data frame for transmission of data received from the user (Step 309), and transmits the data frame to the receiving terminal using the detected channel and frame transfer rate (Step 310).

Figure 10:
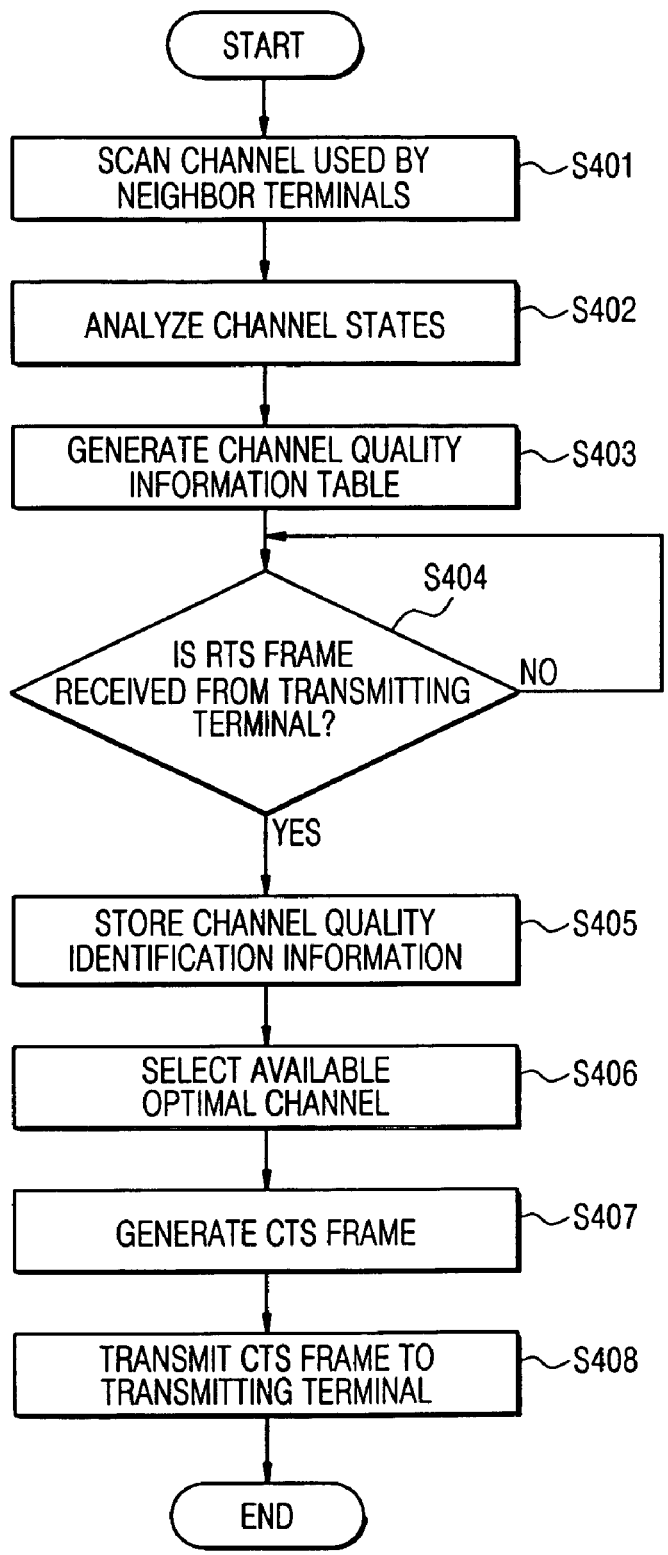
FIG. 10 is a flowchart of a method of processing wireless resources in a receiving terminal, according to an exemplary embodiment of the present invention.

FIG. 10 is a flowchart of a method of processing wireless resources in a receiving terminal, according to an exemplary embodiment of the present invention.

As illustrated in FIG. 10, the receiving terminal scans channels used by the neighboring terminals on the Ad Hoc network in real time or for a predetermined time (Step 401).

The receiving terminal analyzes states of the scanned channels (Step 402), and generates the channel quality information table in which the quality information of each channel is set depending on each channel state (Step 403). The receiving terminal can also analyze the states of the channels overheard from the neighboring terminals and generate the channel quality information table depending on each channel state.

The receiving terminal determines whether or not the RTS frame has been received from an arbitrary terminal, i.e. the transmitting terminal, on the Ad Hoc network (Step 404).

Upon receipt of the RTS frame from the transmitting terminal, the receiving terminal detects and stores the channel quality identification information included in the received RTS frame (Step 405).

The receiving terminal compares the detected channel quality identification information with the generated quality table, and selects the available optimal channel (Step 406).

The receiving terminal generates the CTS frame included in the selected channel (Step 407), and transmits the generated CTS frame to the transmitting terminal (Step 408).

Figure 11:
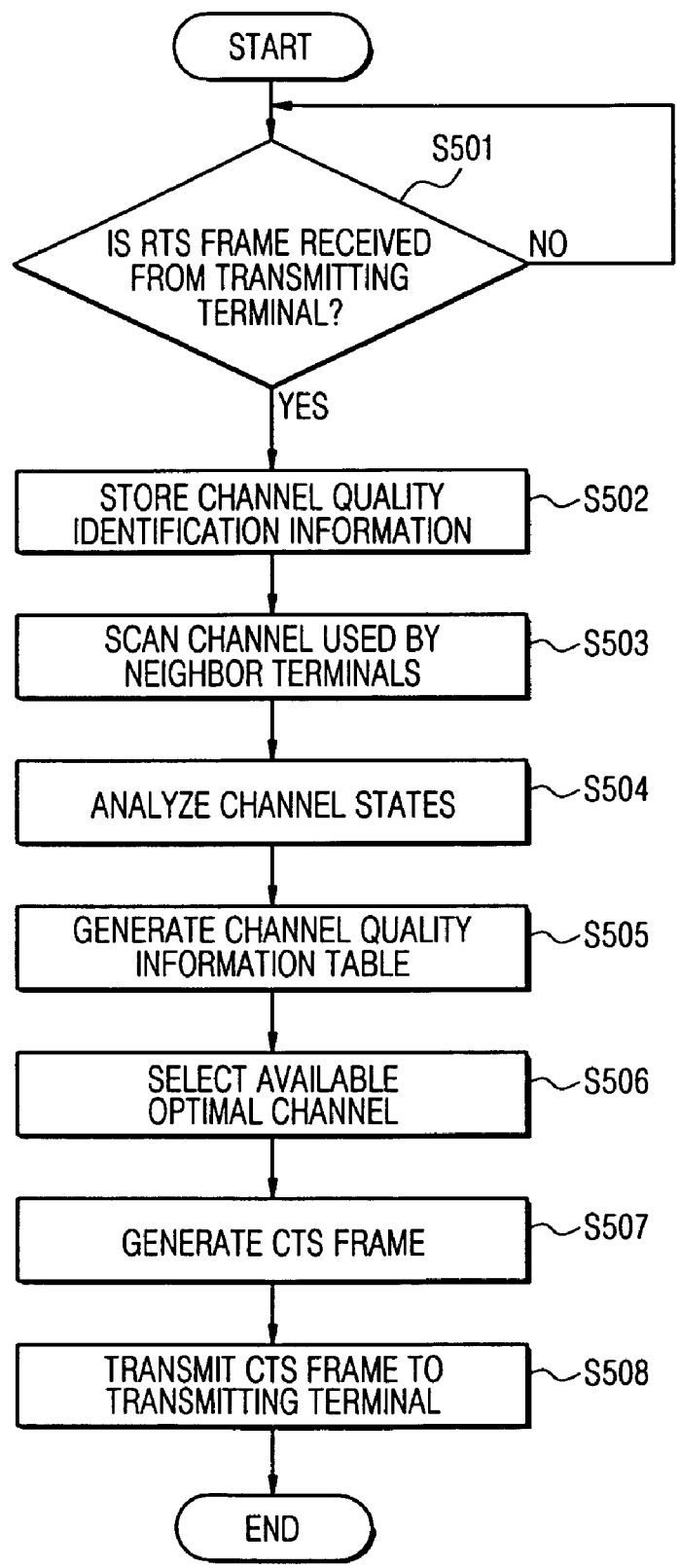
FIG. 11 is a flowchart of a method of processing wireless resources in a receiving terminal, according to another exemplary embodiment of the present invention.

FIG. 11 is a flowchart of a method of processing wireless resources in a receiving terminal, according to another exemplary embodiment of the present invention.

As illustrated in FIG. 11, the receiving terminal determines whether or not an RTS frame has been received from an arbitrary terminal, i.e. a transmitting terminal, on an Ad Hoc network (Step 501).

Upon receipt of the RTS frame from the transmitting terminal, the receiving terminal detects and stores the channel quality identification information included in the received RTS frame (Step 502).

The receiving terminal scans channels used by the neighboring terminals on the Ad Hoc network (Step 503).

The receiving terminal analyzes states of the scanned channels (Step 504) and generates channel quality information table in which quality information of each channel is set depending each channel state (Step 505). The receiving terminal can also analyze states of the channels overheard from the neighboring terminals and generate the channel quality information table depending on each channel state.

The receiving terminal compares the detected channel quality identification information with the generated quality table, and selects an available optimal channel (Step 506).

The receiving terminal generates a CTS frame including the selected channel (Step 507), and transmits the generated CTS frame to the transmitting terminal (Step 508).

In another exemplary embodiment, when receiving the RTS frame from the transmitting terminal, the receiving terminal of FIGS. 10 and 11 can measure the reception intensity of the RTS frame, and detect the frame transfer rate corresponding to the reception intensity.

In this case, the receiving terminal can include the CTS frame for transmitting the detected frame transfer rate to the transmitting terminal.

In the present invention, the frame exchange based on an IEEE 802.11 standard has been described by way of example. However, the present invention is applicable to a wireless network based on other standards.

As described above, the inventive method and apparatus to process the wireless resources in the wireless Ad Hoc network can increase network efficiency of the wireless Ad Hoc network, by allowing the transmitting and receiving terminals of the Ad Hoc network to set the quality information of each wireless resource depending on the state of each network wireless resource, and to select the optimal wireless resource and transfer rate, without a separate message process, through negotiation using the frame transmission request and the response message.

Furthermore, the inventive method and apparatus to process the wireless resources in the wireless Ad Hoc network can transmit the data frame at the highest transfer rate between the transmitting and receiving terminals, by allowing the receiving terminal to detect the frame transfer rate corresponding to the reception intensity of the frame transmission request message received from the transmitting terminal, and allowing the transmitting and receiving terminals to transmit the data frame using the detected frame transfer rate.

While the present invention has been described with reference to exemplary embodiments thereof, it will be understood by those skilled in the art that various modifications in form and detail can be made therein without departing from the scope of the present invention as defined by the following claims.

What is claimed is:

1. A wireless Ad Hoc network, comprising:
a first terminal adapted to scan wireless resources in the network, to set quality information of each wireless resource in accordance with a state of each wireless resource, and to transmit a frame transmission request message containing quality identification information of each wireless resource in accordance with the quality information; and
a second terminal adapted to scan wireless resources in the network, to set quality information of each wireless resource in accordance with a state of each wireless resource, and to select a wireless resource having a highest quality in accordance with the quality identification information of each wireless resource received from the first terminal and the quality information of each scanned wireless resource, and to transmit a frame transmission response message to the first terminal, the frame transmission response message containing, in a field of the frame transmission response message, information on the selected wireless resource, the information on the selected wireless resource comprising an optimal channel, which is a channel having the highest quality per the quality identification information received from the first terminal and the quality information of each wireless resource scanned by the second terminal,
wherein the quality identification information includes a channel quality identification information which is information for sequentially identifying each channel according to priority of the quality information.

2. The network of claim 1, wherein each terminal is adapted to generate the frame transmission request message by sequentially adding the wireless resource identification information in accordance with a priority of the quality information.

3. The network of claim 1, wherein the state of each wireless resource comprises at least one of a share, an error rate, and an available bandwidth of the wireless resource.

4. The network of claim 1, wherein the second terminal is adapted to store the quality information, which is contained in the frame transmission request message, of each wireless resource of the first terminal.

5. The network of claim 1, wherein the first terminal is adapted to detect a frame transfer rate corresponding to a reception intensity of the received frame transmission response message, and to effect data communication with the second terminal, using the detected frame transfer rate and the highest quality wireless resource information contained in the frame transmission response message.

6. The network of claim 1, wherein the second terminal is adapted to detect a frame transfer rate corresponding to a reception intensity of the received frame transmission request message, and to include the detected frame transfer rate in the transmitted frame transmission response message, together with the highest quality wireless resource information.

7. The network of claim 1, wherein each terminal is adapted to transmit the frame transmission request message containing the wireless resource identification information in a Ready-To-Send (RTS) frame.

8. The network of claim 1, wherein each terminal is adapted to transmit the frame transmission response message containing the highest quality wireless resource information in a Clear-To-Send (CTS) frame.

9. A terminal configured for use in a wireless Ad Hoc network, the terminal comprising:
 a table manager adapted to scan wireless resources in the network, to set quality information of each wireless resource in accordance with states of the wireless resources, and to manage the set quality information in a table;
 a controller adapted to transmit a frame transmission request message, containing quality identification information of each wireless resource in accordance with the quality information, to other terminals on the Ad Hoc network, using the table; and
 a transfer rate detector adapted to detect a frame transfer rate corresponding to a reception intensity upon a frame transmission response message corresponding to the frame transmission request message being received from the other terminals of the network, the frame transmission response message containing, in a field of the frame transmission response message, information on the selected wireless resource, the information on the selected wireless resource comprising an optimal channel, which is a channel having the highest quality per the quality identification information received from the first terminal and the quality information of each scanned wireless resource,
 wherein the quality identification information includes a channel quality identification information which is information for sequentially identifying each channel according to priority of the quality information.

10. A wireless Ad Hoc network, comprising:
 a first terminal adapted to scan wireless resources in the network, to set quality information of each wireless resource in accordance with a share of each wireless resource, and to transmit a first frame containing quality identification information of each wireless resource in accordance with the quality information; and
 a second terminal adapted to scan wireless resources in the network, to set quality information of each wireless resource in accordance with a state of each wireless resource, and to select a wireless resource having a highest quality in accordance with the quality identification information of each wireless resource received from the first terminal and the quality information of each scanned wireless resource, to generate a second frame containing, in a field of the second frame, information on the selected wireless resource, and to transmit the second frame to the first terminal, the information on the selected wireless resource comprising an optimal channel, which is a channel having the highest quality per the quality identification information received from the first terminal and the quality information of each wireless resource scanned by the second terminal,
 wherein the quality identification information includes a channel quality identification information which is information for sequentially identifying each channel according to priority of the quality information.

11. A method of processing wireless resources in a wireless Ad Hoc network, the method comprising:

first and second terminals scanning wireless resources in the network, and setting quality information of each wireless resource in accordance with states of the wireless resources;
 the first terminal generating a frame transmission request message containing quality identification information of each wireless resource in accordance with the quality information, and transmitting the generated frame transmission request message to the second terminal;
 the second terminal storing the wireless resource quality identification information received from the first terminal, and selecting wireless resource having a highest quality in accordance with the received wireless resource quality identification information and the set quality information of each wireless resource; and
 the second terminal transmitting, to the first terminal, a frame transmission response message containing, in a field of the frame transmission response message, information on the selected wireless resource, the information on the selected wireless resource comprising an optimal channel, which is a channel having the highest quality per the quality identification information received from the first terminal and the quality information of each wireless resource scanned by the second terminal,
 wherein the quality identification information includes a channel quality identification information which is information for sequentially identifying each channel according to priority of the quality information.

12. The method of claim 11, wherein the first terminal setting the quality information of each wireless resource comprises either generating a frame to be transmitted or scanning the wireless resources in accordance with a preset period, and setting the quality information of each wireless resource.

13. The method of claim 11, wherein the second terminal setting the quality information of each wireless resource comprises either receiving the frame transmission request message or scanning the wireless resources in accordance with a preset period, and setting the quality information of each wireless resource.

14. The method of claim 11, wherein each terminal setting the quality information of each wireless resource comprises overhearing communication between neighboring terminals in the network, detecting wireless resources used by the neighboring terminals, and setting the quality information of each detected wireless resource.

15. The method of claim 11, further comprising the first terminal detecting a frame transfer rate corresponding to a reception intensity of the received frame transmission response message, and effecting data communication with the second terminal using the detected frame transfer rate and the highest quality wireless resource information contained in the frame transmission response message.

16. The method of claim 11, further comprising:
 the second terminal detecting a frame transfer rate corresponding to a reception intensity of the received frame transmission request message, and adding the detected frame transfer rate to the transmitted frame transmission response message; and
 the first terminal transmitting and receiving a data frame using the frame transfer rate and the highest quality wireless resource information contained in the received frame transmission response message.

17. A method of processing wireless resources in a wireless Ad Hoc network, the method comprising:

scanning wireless resources in the network, and setting quality information of each wireless resource in accordance with a share of each wireless resource;

receiving a frame transmission request message containing quality identification information of each wireless resource from other terminals of the network, and storing the received frame transmission request message;

comparing the received quality identification information of each wireless resource with the set quality information of each wireless resource, and selecting a wireless resource having a highest quality; and transmitting a frame transmission response message containing, in a field of the frame transmission response message, information on the selected wireless resource having the highest quality to the other terminals, the information on the selected wireless resource comprising an optimal channel, which is a channel having the highest quality per the quality identification information received from the other terminals and the quality information of each scanned wireless resource, wherein the quality identification information includes a channel quality identification information which is information for sequentially identifying each channel according to priority of the quality information.

18. A method of processing wireless resources in a wireless Ad Hoc network, the method comprising:

first and second terminals scanning wireless resources in the network and setting quality information of each wireless resource in accordance with states of the wireless resources;

the first terminal generating a first frame containing quality identification information of each wireless resource in accordance with the quality information and transmitting the first frame to the second terminal;

the second terminal selecting a wireless resource having a highest quality in accordance with the quality identification information of the received respective wireless resources and the setting quality information of each wireless resource; and the second terminal transmitting, to the first terminal, a second frame containing, in a field of the second frame, information on the selected wireless resource, the information on the selected wireless resource comprising an optimal channel, which is a channel having the highest quality per the quality identification information received from the first terminal and the quality information of each wireless resource scanned by the second terminal, wherein the quality identification information includes a channel quality identification information which is information for sequentially identifying each channel according to priority of the quality information.

19. The method of claim 18, further comprising the first terminal detecting a frame transfer rate corresponding to a reception intensity of the second frame and effecting data communication with the second terminal using the detected frame transfer rate and information of the highest quality wireless resource contained in the second frame.

20. The method of claim 18, further comprising:

the second terminal detecting a frame transfer rate corresponding to a reception intensity of the first frame and adding the detected frame transfer rate the second frame; and the first terminal transmitting and receiving a data frame using the frame transfer rate contained in the second frame and information of the highest quality wireless resource.

* * * * *